United States Patent
Ishii et al.

(10) Patent No.: US 8,999,232 B2
(45) Date of Patent: Apr. 7, 2015

(54) SINTERED BEARING FOR MOTOR-POWERED FUEL INJECTION PUMPS

(75) Inventors: Yoshinari Ishii, Niigata (JP); Tsuneo Maruyama, Niigata (JP); Yoshiki Tamura, Niigata (JP)

(73) Assignee: Diamet Corporation, Niigata-Shi (JP)

( * ) Notice: Subject to any disclaimer, the term of this patent is extended or adjusted under 35 U.S.C. 154(b) by 0 days.

(21) Appl. No.: 13/876,084

(22) PCT Filed: Nov. 7, 2011

(86) PCT No.: PCT/JP2011/075621
§ 371 (c)(1),
(2), (4) Date: Mar. 26, 2013

(87) PCT Pub. No.: WO2012/063785
PCT Pub. Date: May 18, 2012

(65) Prior Publication Data
US 2013/0189150 A1    Jul. 25, 2013

(30) Foreign Application Priority Data

Nov. 10, 2010    (JP) ................................. 2010-251547

(51) Int. Cl.
*C22C 9/02* (2006.01)
*C22C 9/06* (2006.01)
*C22C 1/04* (2006.01)
*F04D 29/02* (2006.01)
*F04D 29/046* (2006.01)
(Continued)

(52) U.S. Cl.
CPC .............. *C22C 9/06* (2013.01); *C22C 1/0425* (2013.01); *C22C 9/02* (2013.01); *F04D 29/026* (2013.01); *F04D 29/046* (2013.01); *C22C 19/03* (2013.01); *F16C 33/128* (2013.01); *F04D 5/002* (2013.01); *F04D 29/047* (2013.01); *F16C 2204/10* (2013.01)

(58) Field of Classification Search
CPC ..................................... C22C 9/06; C22C 9/02
USPC ........................................................ 420/472
See application file for complete search history.

(56) References Cited

U.S. PATENT DOCUMENTS 8,092,091 B2 *   1/2012   Shimizu et al. ............... 384/276
2007/0258668 A1 * 11/2007   Shimizu et al. ................. 384/28

FOREIGN PATENT DOCUMENTS

CN    101098977 A    1/2008
JP    2004-324712 A  11/2004
(Continued)

OTHER PUBLICATIONS

International Search Report mailed Jan. 31, 2012 for the corresponding PCT Application No. PCT/JP2011/075621.
(Continued)

*Primary Examiner* — Jessee Roe
(74) *Attorney, Agent, or Firm* — Leason Ellis LLP.

(57) ABSTRACT

There is provided a bearing for motor-powered fuel injection pumps, made from Cu—Ni-based sintered alloy, which is able to be obtained at a low cost, having excellent corrosion and abrasion resistances. The bearing contains 10 to 20% by mass of Ni, 5 to 13% by mass of Sn, 0.1 to 0.8% by mass of P, 1 to 6% by mass of C, and a remainder containing Cu and inevitable impurities, and is formed with a Ni—Sn—Cu—P phase containing at least 30% by mass of Sn in a grain boundary, and has a 8 to 18% porosity. The Ni—Sn—Cu—P phase contains 30 to 49% by mass of Ni, 10 to 30% by mass of Cu, 0.5 to 1.5% by mass of P, and a remainder containing Sn and inevitable impurities.

6 Claims, 5 Drawing Sheets

(51) Int. Cl.
*C22C 19/03* (2006.01)
*F16C 33/12* (2006.01)
*F04D 5/00* (2006.01)
*F04D 29/047* (2006.01)

(56) References Cited

FOREIGN PATENT DOCUMENTS

| JP | 2006-063398 A | 3/2006 |
| JP | 2006-199977 A | 8/2006 |
| JP | 2008-007796 A | 1/2008 |
| JP | 2009-285983 A | 12/2009 |

OTHER PUBLICATIONS

Chinese Office Action mailed Jun. 23, 2014 for the corresponding Chinese Application No. 201180054205.2.
Chinese Office Action mailed Nov. 17, 2014 for the corresponding Chinese Application No. 201180054205.2.

\* cited by examiner

Electron Micrograph taken for Surface Analysis of
Cu-16Ni-9Sn-0.4P-5C Phase

Electron Micrograph taken for Surface Analysis of
Cu-12.5Ni-9Sn-0.4P-5C Phase

Electron Micrograph taken for Surface Analysis of
Cu-8.2Ni-9Sn-0.4P-5C Phase

SINTERED BEARING FOR MOTOR-POWERED FUEL INJECTION PUMPS

CROSS-REFERENCE TO RELATED PATENT APPLICATIONS

This application is a U.S. National Phase Application under 35 U.S.C. §371 of International Patent Application No. PCT/JP2011/075621, filed Nov. 7, 2011, and claims the benefit of Japanese Patent Application No. 2010-251547, filed Nov. 10, 2010, all of which are incorporated by reference herein. The International Application was published in Japanese on May 18, 2012 as International Publication No. WO/2012/063785 under PCT Article 21(2).

FIELD OF THE INVENTION

The present invention relates to a sintered bearing for motor-powered fuel injection pumps, made from a Cu-based sintered alloy.

BACKGROUND OF THE INVENTION

Heretofore, engines employing liquid fuel have been equipped with a motor-powered fuel injection pump to allow the liquid fuel to be injected into a combustion chamber of the engine by means of this motor-powered fuel injection pump.

As a motor-powered fuel injection pump employed for a gasoline engine, there is known one structured as shown in FIG. 5, for example. In the pump shown in FIG. 5, a rotating shaft is supported by bearings fixed to both ends of the motor. An impeller is fixed to one end of the rotating shaft and a gasoline flow passage is formed on outer circumferential surfaces of the impeller and motor. Then, gasoline is boosted by a rotating operation of the impeller to be injected into a combustion chamber, not shown, of the engine.

Whereas gasoline engines are being employed in various places of the world, low-quality gasoline containing organic acid is being employed as fuel for the gasoline engines in some regions. In the case that the low-quality gasoline containing organic acid is used, there has been a problem that the bearing for the motor-powered fuel injection pump becomes eroded by the organic acid.

In order to solve such a problem, Japanese unexamined patent application publication No. 2006-199977, e.g., discloses a bearing for a motor-powered fuel injection pump, which is made from a Cu—Ni-based sintered alloy.

Problem to be Solved by the Invention

A bearing disclosed in Japanese unexamined patent application publication No. 2006-199977 includes a texture in which a Sn-highly-concentrated alloy layer containing 50% or more by mass of Sn is formed to thereby improve its corrosion resistance. As yet, however, there has been a problem that this bearing contains as much as 21 to 35% by mass of expensive Ni and hence it is not able to be manufactured at low cost.

Therefore, it is an object of the present invention to provide, by sweeping the above problem away, a bearing for motor-powered fuel injection pumps, made from a Cu—Ni-based sintered alloy that is inexpensive, and excellent in corrosion and abrasion resistances.

SUMMARY OF THE INVENTION

Means for Solving the Problem

A bearing for motor-powered fuel injection pumps according to the present invention contains 10 to 20% by mass of Ni, 5 to 13% by mass of Sn, 0.1 to 0.8% by mass of P, 1 to 6% by mass of C, and a remainder containing Cu and inevitable impurities, and is formed with a Ni—Sn—Cu—P phase containing at least 30% by mass of Sn at a grain boundary and further has a 8 to 18% porosity.

Furthermore, the Ni—Sn—Cu—P phase contains 30 to 49% by mass of Ni, 10 to 30% by mass of Cu, 0.5 to 1.5% by mass of P, and a remainder containing Sn and inevitable impurities.

Effects of the Invention

According to the present invention, the bearing for motor-powered fuel injection pumps contains 10 to 20% by mass of Ni, 5 to 13% by mass of Sn, 0.1 to 0.8% by mass of P, 1 to 6% by mass of C, and a remainder containing Cu and inevitable impurities, and is formed with the Ni—Sn—Cu—P phase containing at least 30% by mass of Sn at a grain boundary, and has a 8 to 18% porosity. Thus, the bearing for motor-powered fuel injection pumps can be manufactured at a low cost and can exhibit excellent corrosion and abrasion resistances even in low-quality gasoline containing organic acid.

Further, according to the present invention, the Ni—Sn—Cu—P phase contains 30 to 49% by mass of Ni, 10 to 30% by mass of Cu, 0.5 to 1.5% by mass of P, and a remainder containing Sn and inevitable impurities. Thus, the bearing for motor-powered fuel injection pump becomes excellent in corrosion and abrasion resistances.

DETAILED DESCRIPTION OF THE INVENTION

Figure 1:
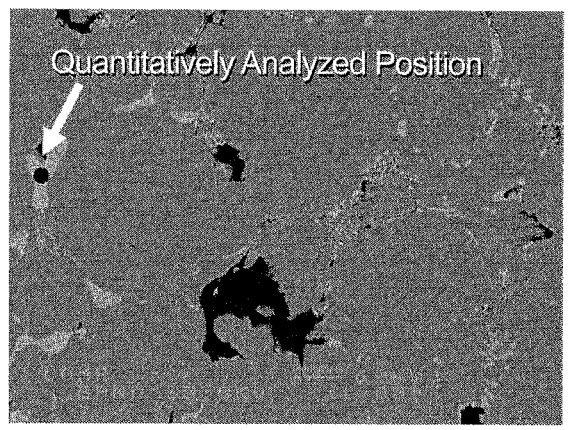
FIG. 1 is an electron micrograph of a Ni—Sn—Cu—P alloy phase in a working example 7 of the present invention.

Best Mode for Carrying Out the Invention

A sintered bearing for motor-powered fuel injection pumps according to the present invention contains, in mass %, 10 to 20% of Ni, 5 to 13% of Sn, 0.1 to 0.8% of P, 1 to 6% of C, and a remainder containing Cu and inevitable impurities, in which a Ni—Sn—Cu—P phase containing at least 30% by mass of Sn is formed at a grain boundary and the porosity of the bearing is 8 to 18%. Thus, this composition enables the bearing for motor-powered fuel injection pumps to be manufactured at a low cost and to exhibit excellent corrosion and abrasion resistances even in low-quality gasoline containing organic acid. Further, in the case that the Ni—Sn—Cu—P phase contains, in mass %, 30 to 49% of Ni, 10 to 30% of Cu, 0.5 to 1.5% of P, and a remainder containing Sn and inevitable impurities, the bearing becomes more excellent in corrosion and abrasion resistances.

Next is a a detailed description of a composition, etc. of the sintered bearing for motor-powered fuel injection pumps according to the present invention. Note that units of the hereinbelow-described contents are all to be denoted as mass %.

(1) Ni: 10 to 20% by Mass

Ni, together with Sn, Cu and P, forms a Ni—Sn—Cu—P phase at a grain boundary through a sintering process, thereby imparting excellent corrosion resistance to a bearing. If the content of Ni is less than 10%, a grain boundary phase is not sufficiently formed, making it impossible to obtain a desired corrosion resistance. On the other hand, even if the content of Ni exceeds 20%, the corrosion resistance is less effectively improved, leading to an undesirable increase in a raw material cost.

(2) P: 0.1 to 0.8% by Mass

P improves sintering performance of green compacts to enhance the strength of a basis material. If the content of P is less than 0.1%, the strength of a basis material is less effectively improved. On the other hand, if it exceeds 0.8%, an increased dimensional change occurs at the time of a sintering process, leading to an undesirable reduction in dimensional accuracy.

(3) Sn: 5 to 13% by Mass

Sn, together with Ni, Sn and P, forms a Ni—Sn—Cu—P phase at a grain boundary through a sintering process, thereby imparting excellent corrosion resistance to a bearing. If the content of Sn is less than 5%, the grain boundary phase is not sufficiently formed, making it impossible to obtain a desired corrosion resistance. On the other hand, if the content of Sn exceeds 13%, an increased dimensional change occurs at the time of a sintering process, leading to an undesirable reduction in dimensional accuracy.

(4) C: 1 to 6% by Mass

C derives from graphite. C exists as free graphite inside gas pockets distributed inside a basis material and imparts an excellent lubricating property to a bearing and improves abrasion resistance therein. If the content of C is less than 1%, there cannot be obtained a desired effect thereof. On the other hand, if it exceeds 6%, the abrasion resistance is less effectively improved, leading to an undesirable decrease in strength of the bearing.

(5) Porosity: 8 to 18%

Gas pockets are distributed in a basis material, which serves to reduce high friction to which a bearing is subjected during high-pressure and high-speed flow of liquid fuel, thereby leading to an effect of suppressing the abrasion of the bearing. If the porosity is less than 8%, the effect thereof is insufficient, while if it exceeds 18%, the strength of the bearing remarkably decreases, leading to an undesirable result.

(6) with Respect to the Ni—Sn—Cu—P Phase Containing at Least 30% by Mass of Sn

The Ni—Sn—Cu-p phase containing at least 30% by mass of Sn formed at a grain boundary of a basis material imparts excellent corrosion resistance in low-quality gasoline containing organic acid.

In order to form the Ni—Sn—Cu—P phase containing at least 30% by mass of Sn at a grain boundary, it is necessary to appropriately set contents of Ni and Sn and a sintering temperature condition. By employing a Cu—Ni—Sn—P-based composition in which the content of Ni is set at 10% or more by mass and the content of Sn is set at 5% or more by mass with a sintering temperature set at 840 to 940 degrees C., there can be efficiently formed at a grain boundary such Ni—Sn—Cu—P phase containing at least 30% by mass of Sn. The Ni—Sn—Cu—P phase formed under the above condition contains, in mass %, 30 to 40% of Sn, 30 to 49% of Ni, 10 to 30% of Cu, and 0.5 to 1.5% of P.

Next is a description of specific embodiments of the sintered bearing for motor-powered fuel injection pumps according to the present invention. Note that the present invention is not limited to the following embodiments and various modifications are possible.

Embodiment 1

(1) Preparation of the Sintered Bearings for Motor-Powered Fuel Injection Pumps

As raw powders, there were prepared a Cu-30% Ni powder, a Cu-25% Ni powder, a Cu-15% Ni powder, a Cu-8% P powder, an Sn powder, a graphite powder, and a Cu powder, any of which powders having a 100 mesh particle size. These raw powders were compounded so as to have compositions shown in Table 1, and then 0.5% by mass of stearic acid was added thereto and mixed together by a V-type mixer for 20 minutes, followed by subjecting the composites to pressure molding at a given pressure, and thus, green compacts were produced. Then, the green compacts thus produced were sintered at a predetermined temperature within 840 to 940 degrees C. in an atmosphere of an endothermic gas obtained by mixing a natural gas and air and then decomposing and modifying the mixtures by passing the same through a heated catalyst, then followed by subjecting the same to a sizing step. By applying the above process, prepared were bearings of the present invention (hereunder, referred to as working examples of the present invention) which were 10 mm in outer diameter, 5 mm in inner diameter and 5 mm in height and had the compositions shown in Table 1, while a bearing for comparison (hereunder, referred to as a comparative example) containing less than 10% by mass of Ni was prepared.

The working examples of the present invention thus obtained included gas pockets distributed at rates of 8 to 18% and free graphite also distributed therein. After analyzing cross-sectional structures of the working examples of the present invention and the comparative example, using an electron probe microanalizer (EPMA) (applying 1,000 magnifying power), the working examples of the present invention were found to be formed with a Sn-rich Ni—Sn—Cu—P phase containing at least 30% by mass of Sn in their grain boundaries, while the comparative example was not found to be formed with such a Sn-rich phase containing at least 30% by mass of Sn in its grain boundary.

TABLE 1

| Bearings | | Element Composition (% by mass) | | | | | Presence of Ni—Sn—Cu—P-based Alloy Phase | Porosity % | Maximum Abraded Depth (μm) | Mass Change due to Corrosion Resistance Test (%) |
|---|---|---|---|---|---|---|---|---|---|---|
| | | Ni | Sn | P | C | Cu | | | | |
| Working Examples of the Present Invention | 1 | 10.3 | 5.7 | 0.3 | 1.2 | remainder | Yes | 12.6 | 4.8 | −0.37 |
| | 2 | 11.5 | 6.6 | 0.3 | 2.0 | remainder | Yes | 10.3 | 3.1 | −0.27 |
| | 3 | 12.5 | 7.6 | 0.3 | 2.5 | remainder | Yes | 15.2 | 3.5 | −0.15 |
| | 4 | 13.4 | 8.5 | 0.4 | 3.0 | remainder | Yes | 12.6 | 2.6 | −0.23 |
| | 5 | 14.5 | 9.1 | 0.4 | 3.5 | remainder | Yes | 17.6 | 2.5 | −0.36 |
| | 6 | 15.5 | 9.7 | 0.4 | 4.0 | remainder | Yes | 14.8 | 1.8 | −0.12 |
| | 7 | 16.6 | 10.3 | 0.4 | 4.5 | remainder | Yes | 14.3 | 1.2 | −0.08 |
| | 8 | 17.5 | 11.1 | 0.4 | 5.0 | remainder | Yes | 13.5 | 0.8 | −0.11 |
| | 9 | 18.5 | 11.9 | 0.5 | 5.5 | remainder | Yes | 8.7 | 1.0 | −0.07 |
| | 10 | 19.7 | 12.8 | 0.5 | 5.8 | remainder | Yes | 11.2 | 0.9 | −0.11 |

TABLE 1-continued

| Bearings | Element Composition (% by mass) | | | | | Presence of Ni—Sn—Cu—P-based Alloy Phase | Porosity % | Maximum Abraded Depth (μm) | Mass Change due to Corrosion Resistance Test (%) |
|---|---|---|---|---|---|---|---|---|---|
| | Ni | Sn | P | C | Cu | | | | |
| Comparative Example 1 | 7 | 4 | 0 | 0.7 | remainder | No | 15.4 | 21.0 | −2.46 |

(2) Abrasion Resistance Test

An abrasion resistance test was performed under such conditions that gasoline was allowed to flow through a narrow space at high flow rates in the forgoing working examples of the present invention and the comparative example, and thus the bearings were subjected to a high pressure due to the high speed rotation of a motor while being exposed to the high-flow-rate gasoline.

The bearings were each incorporated into a fuel pump having an overall size of 110 mm in length, 40 mm in diameter and the fuel pump was set inside a gasoline tank. Then, a test using an actual device was performed under such conditions of impeller revolution speed: 5,000 to 15,000 rpm; gasoline flow rate: 50 to 250 l/hr; pressure applied to the bearings by the high speed revolution of the impeller: up to 500 kPa; and test time: 500 hr. Maximum abraded depths were measured on bearing surfaces after the test. The result is shown in Table 1.

The maximum abraded depth of the working examples of the present invention was 4.8 μm or less, proving that their abrasion resistances were high.

Contrarily, the maximum abraded depth of the comparative example was 21.0 μm, proving that its abrasion resistance was significantly low as compared to the working examples of the present invention.

(3) Corrosion Resistance Test

Corrosion resistance tests of the working examples of the present invention and comparative example were performed.

An organic acid test solution was prepared by adding carboxylic acid expressed by RCOOH (R denotes a hydrogen atom or a hydrocarbon group) to the gasoline, simulating a quasi-low-quality gasoline. After heating the organic acid test solution to 60 degrees C., the working examples of the present invention and comparative example were immersed into the organic acid test solution to be kept for 200 hr therein. Then, mass changes before and after immersing the bearings into the organic acid test solution were measured. The result is shown in Table 1.

The mass change rates of the working examples of the present invention were 0.37% or less, proving that their corrosion resistance was high.

Contrarily, the mass change rates of the comparative example was 2.46%, proving that its corrosion resistance was significantly low.

(4) Analysis Using an Electron Probe Microanalyser

With respect to the alloy of the working example 7 of the present invention, its Cu, Ni, Sn and P in the Ni—Sn—Cu—P alloy phase were analyzed using an electron probe microanalyser (EPMA). The analyzing conditions were such that an acceleration voltage was 15 kV and a beam diameter φ was set at 1 μm, and then, a central portion of the Ni—Sn—Cu—P alloy phase, as one example, was analyzed as shown in the electron micrograph (a COMPO image) in FIG. 1. Five different portions in the Ni—Sn—Cu—P alloy phase were measured to calculate the average of the measured values. The result is shown in Table 2.

It was verified that a Ni—Sn—Cu—P alloy phase having a Sn concentration of 30% or more was present in the alloy of the working example 7 of the present invention.

TABLE 2

| | Analytical value (% by mass) | | | |
|---|---|---|---|---|
| | Sn | Cu | P | Ni |
| Ni—Sn—Cu—P Alloy Phase in the Working Example 7 of the Present Invention | 36.276 | 22.756 | 1.078 | remainder |

Embodiment 2

Figure 2:
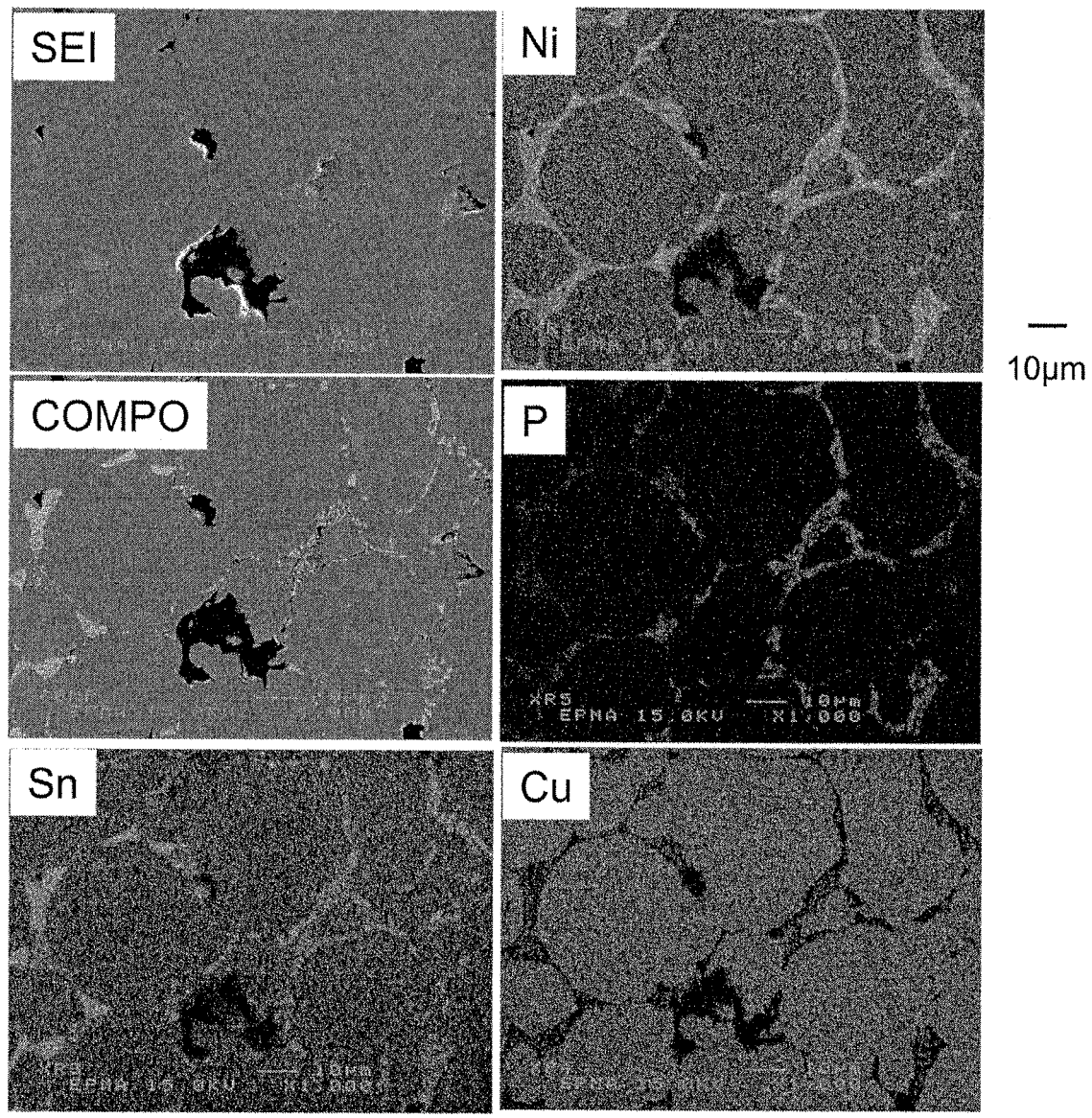
FIG. 2 is an electron micrograph of a bearing containing 9% by mass of Sn, 0.4% by mass of P, 5% by mass of C and 16% by mass of Ni, and Cu as a remainder.
Figure 3:
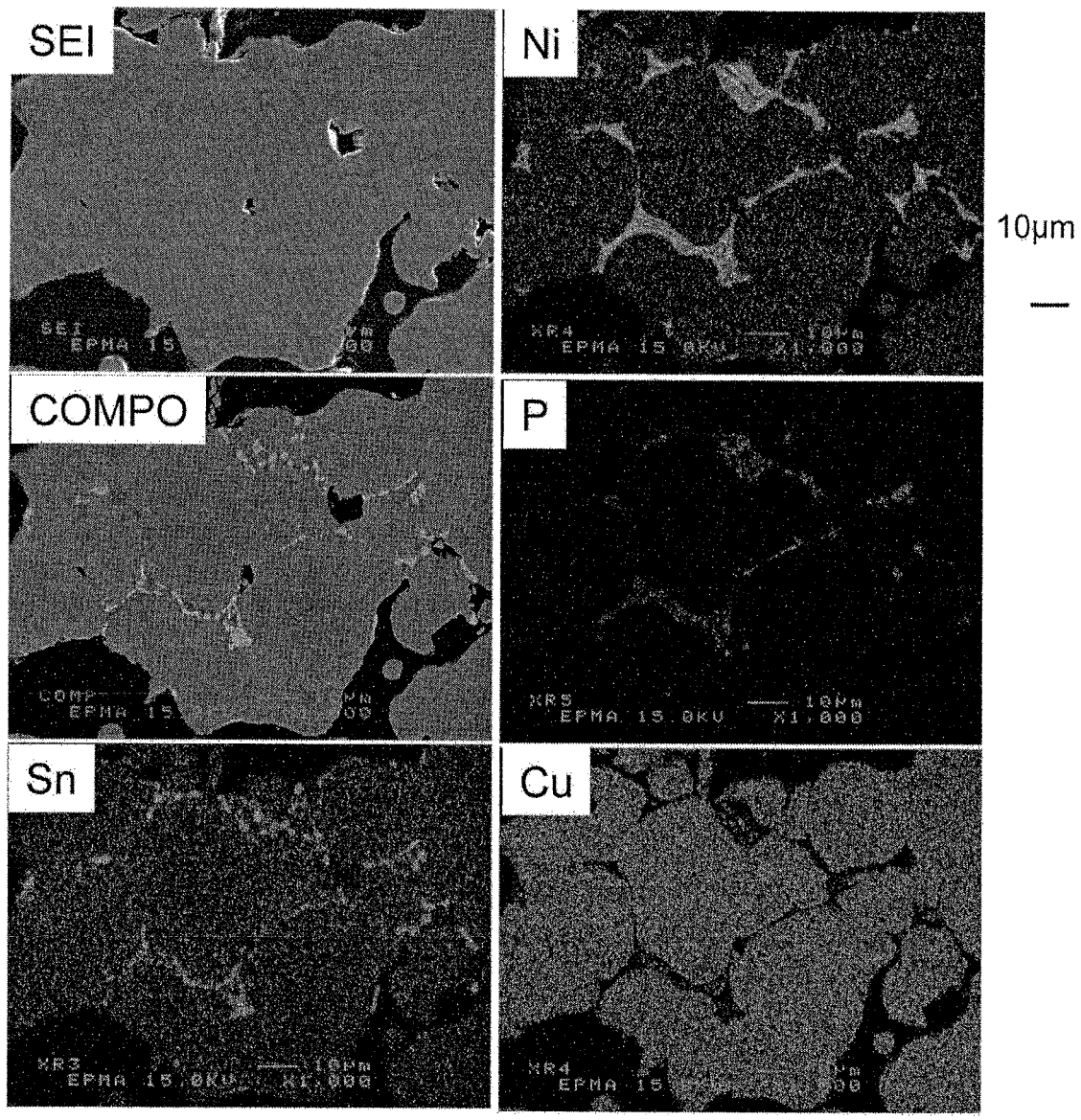
FIG. 3 is an electron micrograph of a bearing containing the same contents as those in FIG. 2 except that Ni is 12.5% by mass.
Figure 4:
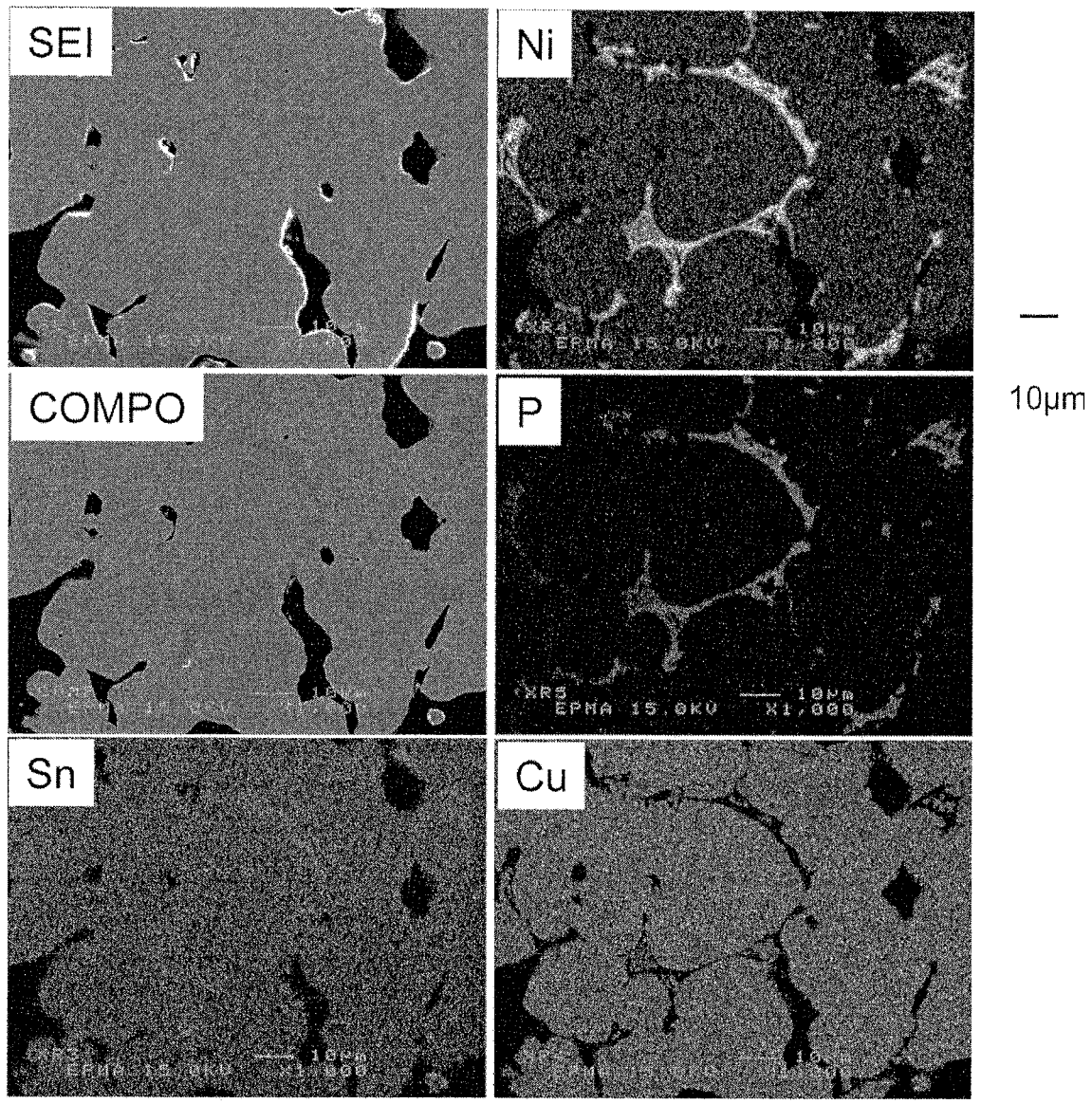
FIG. 4 is an electron micrograph of a bearing containing the same contents as those in FIG. 2 except that Ni is 8.2% by mass.
Figure 5:
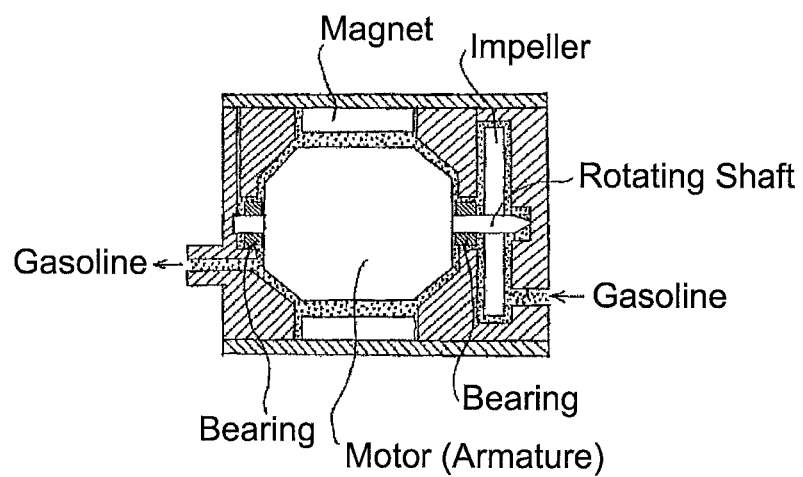
FIG. 5 is a cross-sectional view illustrating a structure of a motor-powered fuel injection pump employed for a gasoline engine.

By the same method as in the embodiment 1, three kinds of bearings having different compositions were prepared. Then, distribution of Sn, Ni, P and Cu on a cross-sectional surface of each bearing was analyzed using an electron probe microanalyser (EPMA). The analyzing condition was set at 15 kV for an acceleration voltage. The result is shown in FIG. 2 to FIG. 4. Note that "SEI" shown in the figures denotes a secondary electron image and "COMPO" denotes a reflection electron composition image.

FIG. 2 is an electron micrograph of one sample containing 9% of Sn, 0.4% of P, 5% of C, 16% of Ni, and Cu as a remainder. FIG. 3 is an electron micrograph of another sample containing the same contents of Sn, P and C as those in FIG. 2 but Ni content of 12.5%. It was clearly verified from FIG. 2 and FIG. 3 that there existed, in the basis materials, metallographic structures in which was distributed a Ni—Sn—Cu—P alloy phase having higher contents of Sn, Ni and P but lower content of Cu than those of the basis material.

On the other hand, FIG. 4 is an electron micrograph of another sample containing the same contents of Sn, P and C as those in FIG. 2 but Ni content of 8.2%. (outside the scope of the present invention). In FIG. 4, no Sn-rich phase could be found.

The invention claimed is:
1. A sintered bearing for motor-powered fuel injection pumps, comprising:
   10 to 20% by mass of Ni;
   5 to 13% by mass of Sn;
   0.1 to 0.8% by mass of P;
   1 to 6% by mass of C; and
   a remainder containing Cu and inevitable impurities, wherein
   a Ni—Sn—Cu—P phase containing at least 30% by mass of Sn is provided at a grain boundary,
   said bearing has a porosity of 8 to 18%, and
   the bearing is obtained by sintering at a temperature in a range of 840 to 940 degrees C.

2. The sintered bearing for motor-powered fuel injection pumps according to claim 1, wherein said bearing is obtained by sintering in an atmosphere of an endothermic gas.

3. The sintered bearing for motor-powered fuel injection pumps according to claim 1, wherein the endothermic gas comprises natural gas and air that are discomposed by passing through a heated catalyst.

4. The sintered bearing for motor-powered fuel injection pumps according to claim 1, wherein said Ni—Sn—Cu—P phase contains 30 to 49% by mass of Ni, 10 to 30% by mass of Cu, and 0.5 to 1.5% by mass of P, and a remainder containing Sn and inevitable impurities.

5. The sintered bearing for motor-powered fuel injection pumps according to claim 4, wherein said bearing is obtained by sintering in an atmosphere of an endothermic gas.

6. The sintered bearing for motor-powered fuel injection pumps according to claim 4, wherein the endothermic gas comprises natural gas and air that are discomposed by passing through a heated catalyst.

* * * * *